US012322902B2

(12) United States Patent
Havermann

(10) Patent No.: US 12,322,902 B2
(45) Date of Patent: Jun. 3, 2025

(54) UNLOCKING AID

(71) Applicant: HARTING Electronics GmbH, Espelkamp (DE)

(72) Inventor: Gert Havermann, Wallenhorst (DE)

(73) Assignee: HARTING Electronics GmbH, Espelkamp (DE)

( * ) Notice: Subject to any disclaimer, the term of this patent is extended or adjusted under 35 U.S.C. 154(b) by 316 days.

(21) Appl. No.: 17/916,271

(22) PCT Filed: Apr. 28, 2021

(86) PCT No.: PCT/DE2021/100385
§ 371 (c)(1),
(2) Date: Sep. 30, 2022

(87) PCT Pub. No.: WO2021/223801
PCT Pub. Date: Nov. 11, 2021

(65) Prior Publication Data

US 2023/0145763 A1 May 11, 2023

(30) Foreign Application Priority Data

May 4, 2020 (DE) ..................... 10 2020 111 907.0

(51) Int. Cl.
*H01R 13/633* (2006.01)
*H01R 43/26* (2006.01)

(52) U.S. Cl.
CPC ......... *H01R 13/6335* (2013.01); *H01R 43/26* (2013.01)

(58) Field of Classification Search
CPC ... H01R 13/6335; H01R 13/635; H01R 43/26
USPC ............................................... 439/476.1, 352
See application file for complete search history.

(56) References Cited

U.S. PATENT DOCUMENTS

| | | | | |
|---|---|---|---|---|
| 6,447,170 | B1 | 9/2002 | Takahashi et al. | |
| 8,855,458 | B2 * | 10/2014 | Belenkiy | G02B 6/3897 385/137 |
| 9,891,392 | B2 | 2/2018 | Kanno | |
| 10,396,493 | B2 * | 8/2019 | Bowman | H01R 13/623 |
| 2009/0226140 | A1 | 9/2009 | Belenkiy et al. | |
| 2014/0068912 | A1 * | 3/2014 | Schiele | H01R 43/26 29/426.6 |
| 2019/0074631 | A1 | 3/2019 | Bowman et al. | |

FOREIGN PATENT DOCUMENTS

| | | | |
|---|---|---|---|
| EP | 1065756 | B1 | 3/2005 |
| JP | 2004020880 | A | 1/2004 |
| JP | 2009042767 | A | 2/2009 |
| WO | 2009111527 | A1 | 9/2009 |

* cited by examiner

*Primary Examiner* — Gary F Paumen
(74) *Attorney, Agent, or Firm* — Smartpat PLC

(57) ABSTRACT

An unlocking aid for simplifying a process of releasing an electrical connector from a mating electrical connector is disclosed. The electrical connector comprises at least one locking mechanism, at least one housing element and at least one cable connection. The unlocking aid is brought into engagement with the locking mechanism of the electrical connector from outside the electrical connector and, by means of a connecting element, leads a gripping region to a position substantially behind the cable connection in order to release the locking mechanism.

4 Claims, 2 Drawing Sheets

UNLOCKING AID

TECHNICAL FIELD

The disclosure relates to an unlocking aid. Such unlocking aids are required in order to be able to release the locked state of plug connections quickly and easily in densely populated connection areas, such as switch cabinet panels, server panels, switches or comparable elements.

BACKGROUND

In the prior art, unlocking aids exist for data connectors of the "RJ-45" type, which are commonly known as the connectors of data cables such as "patch cables" or "LAN cables". These connectors are also required in densely populated areas, such as servers, server farms and similar fields of application. Particularly in servers, switches and hubs, it is desirable to be able to reach individual connectors between the sometimes unmanageable number of connectors and to be able to detach them from the mating connector element. Due to the high number of components, it is a very laborious process to release the connector, as it is not always possible to reach the locking mechanism of the connector directly without difficulty.

A disadvantage of the prior art is that all unlocking aids are used only as an integrated solution for connectors of the "RJ-45" type.

Especially in the industrial sector, connectors other than the previously mentioned "RJ-45" connectors are often used for data transmission. Circular connectors of the "M12" and/or "M8" type are very common. Arrays and/or device connection panels are also frequently used for these connectors and provide for a large number of cables to be connected together with the previously mentioned connectors. In order to make sensible use of the space available for arrays, for example, the connection region for the connectors used is becoming increasingly smaller. To speed up and simplify assembly, connectors are increasingly being equipped with so-called "push-pull mechanism" locking mechanisms. However, it is increasingly difficult for assemblers and maintenance personnel to remove individual connectors from the corresponding array for maintenance and/or repair purposes, as the locking mechanisms are becoming increasingly difficult to reach, especially in the case of arrays and/or device connection panels that are generally fully populated.

The German Patent and Trade Mark Office has searched the following prior art in the priority application for the present application: JP 2009-42767 A, US 2014/0068912 A1, WO 2009/111527 A1, U.S. Pat. No. 9,891,392 B2 and JP 2004-20880 A.

SUMMARY

The problem addressed by the disclosure is to provide an unlocking aid for a connector, in particular a circular connector, which allows the plugged connection to be released away from the connector. A further problem addressed by the disclosure is to provide a connector, in particular a circular connector, with an unlocking aid, in particular for a push-pull mechanism.

The problem is solved by the subject matter of the independent claims.

Advantageous embodiments of the invention are described in the dependent claims and the following description.

To solve the problem, an embodiment of an unlocking aid for simplifying the process of releasing a connector from a mating connector is proposed, wherein the connector comprises at least one locking mechanism, in particular embodied as a "push-pull mechanism", at least one housing element, and at least one cable connection. In this case, the unlocking aid is brought into engagement with the locking mechanism of the connector from outside the connector and, by means of a connecting element, guides a gripping region to a position substantially behind the cable connection in order to release the locking mechanism. The unlocking aid is configured in particular for circular connectors. Circular connectors of the "M12 circular connector" type are to be understood as circular connectors, for example. The unlocking aid allows locking mechanisms of connectors, in particular circular connectors, to be opened without tools. This means that no tools other than the unlocking aid need to be used. In other words, once the unlocking aid is attached to the connector, it becomes part of the connector. However, other connectors may equally benefit from the unlocking aid according to the invention. The expression "from outside the connector" means, in particular, that an unlocking aid according to the invention is attached substantially from outside a housing of a connector, in particular a circular connector. This means that an unlocking aid according to the invention can also be used with connectors which were not initially intended for the attachment of an unlocking aid. This makes the unlocking aid ideally suited for retrofitting various types of connectors, in particular circular connectors. As a "connecting element", a rib integrally formed on the unlocking aid is initially proposed and establishes a connection between the end of the unlocking aid acting on the locking mechanism and a gripping region. An unlocking aid of which the connecting element and gripping region are made of the same material and/or are integrally formed on the unlocking aid is particularly easily and cost-effectively producible. The use of a flexible material is particularly handy here. Alternatively, an unlocking aid can be made of different materials. For example, the unlocking aid is made with a rigid material and the connecting element and/or the gripping region is made of a flexible material, or vice versa. The "gripping region" is to be understood substantially as a region of the unlocking aid which is located substantially at the height of the cable connection, ideally behind the cable connection, i.e. is led out beyond the installation space of the connector, counter to the plug-in direction. In this context, the "plug-in direction" is to be understood as a vector which runs substantially parallel to a housing element of the connector and is generally oriented from the cable connection in the direction of the locking mechanism of the connector. Advantageously, the gripping region is provided with a gripping aid. The gripping aid is, for example, a profiled surface or is embodied with an integrally formed or recessed geometric shape, which makes it easier for a user to release the locking mechanism of the connector, in particular by applying a force counter to the plug-in direction. Particularly preferably, the gripping aid is embodied as a through-opening which, for example, allows at least substantially the passage of part of a human finger, or a hook.

In a handy embodiment, an unlocking aid on a connector is brought into engagement with a locking mechanism embodied as a push-pull mechanism. The locking mechanisms referred to as push-pull mechanisms are particularly suitable for being equipped with an unlocking aid according to the invention. This is because, by means of a simple pulling movement carried out by the connector in the direction of the associated cable connection, an unlocking aid can release the locking mechanism in accordance with the intended use. For this purpose, the unlocking aid has a fastening device, wherein the fastening device is arranged at least partially on the locking mechanism of the connector. For this purpose, a hook is usually a suitable fastening device, although a ring formed substantially as a circumferential, hook-shaped ring and arranged in the unlocking aid would also be conceivable.

In a preferred embodiment, the unlocking aid is substantially bushing-like, wherein the unlocking aid is connected to the locking mechanism. The term "bushing-like" means in particular that the unlocking aid of this type has substantially the shape of a hollow cylinder, which can be pushed or pressed over the connector, in particular over the locking mechanism. In so doing, the fastening device of the unlocking aid engages at least part-circularly around the locking mechanism. Ideally, the unlocking aid is guided over the locking mechanism of the connector, where it is brought into engagement in a frictionally engaged and/or interlocking manner with the locking mechanism. In this embodiment, a fastening device can be embodied as a simple hook or at least partially circumferential collar within the unlocking aid, which engages, for example, in a groove or a recess in the outer region of the locking element of the connector. This embodiment can, for example, have a fastening element such as a U-shaped or C-shaped clip, so that the unlocking aid can be permanently but releasably connected to the connector, or to the locking element of the connector.

A further developed embodiment provides for the unlocking aid to be guided over the locking mechanism in the opposite direction to the plug-in direction, wherein the unlocking aid comprises at least one through-opening. In this way, in particular in the case of an unlocking aid which is substantially hollow-cylindrical, it is easy to bring it into connection with a locking mechanism. In this case, the through-opening is oriented in the plug-in direction and ensures that the connector is easily plug-connected to the mating connector. In other words, an unlocking aid is pushed onto the connector in the opposite direction to the plug-in direction, wherein a through-opening allows the connector to be plug-connected to a mating connector. The locking mechanism, in particular embodied as a push-pull mechanism, can be released by a simple pulling movement against the plug-in direction.

A clever embodiment provides for the fastening device to be brought into engagement with the locking mechanism in a region between the connector and a mating connector. For this purpose, in one version, the unlocking aid is embodied with a fastening device that is placed on the outer region of the locking element in a manner substantially comparable to a safety clip. In an alternative version, the fastening device is brought into engagement in a retaining device of the connector, wherein the retaining device is arranged on the locking mechanism.

Furthermore, the disclosure relates to a connector comprising at least one housing element, a locking mechanism and at least one cable connection, wherein the locking mechanism is provided with a retaining device, and wherein the retaining device is brought into engagement with a fastening device of an unlocking aid. Particularly preferably, a retaining device is formed with at least one pin. The fastening device of the unlocking aid is formed as a blind hole or through-opening and can be connected to the pin.

In a handy embodiment, the connector is formed substantially as a circular connector and the locking mechanism is embodied as a push-pull locking mechanism. In this way, it is easily ensured that an improved unlocking of a plug connection comprising a connector with a push-pull locking mechanism on a mating connector, in particular a plug array, is possible with a minimally changed installation space compared to the previous prior art.

Furthermore, a particularly beneficial embodiment of an electrical connector is one in which the unlocking aid is fastened to the locking mechanism so as to be pivotable about at least one axis. By means of a pivotably mounted unlocking aid, in particular the assembly of the connector can be simplified. This is because, in order to fasten a cable to the connector, the unlocking aid can first be pivoted out of the assembly region. To release the connector from a mating connector, the unlocking aid attached to the locking mechanism can be reached quickly, unlike the actual locking mechanism itself. Thus, even with very crowded and densely arranged arrays, the unlocking aid can be reached quickly, since it is possible to reach through the multitude of connected cables. Another particular advantage of this embodiment is that the unlocking aid does not have to be moved exactly parallel counter to the plug-in direction and yet the locking mechanism can still be released. Furthermore, an unlocking aid can be applied in a simple manner to a connector which is of angular design, while no unlocking is desired, or necessary. Thus, space can be saved, while at the same time a simplified unlocking is possible at any time due to the arranged unlocking aid.

BRIEF DESCRIPTION OF THE DRAWINGS

An exemplary embodiment of the invention is shown in the drawings and is explained in more detail below. In the drawings.

DETAILED DESCRIPTION

The figures contain partially simplified, schematic representations. In part, identical reference signs are used for like, but possibly non-identical elements. Different views of like elements may be scaled differently.

Figure 1:
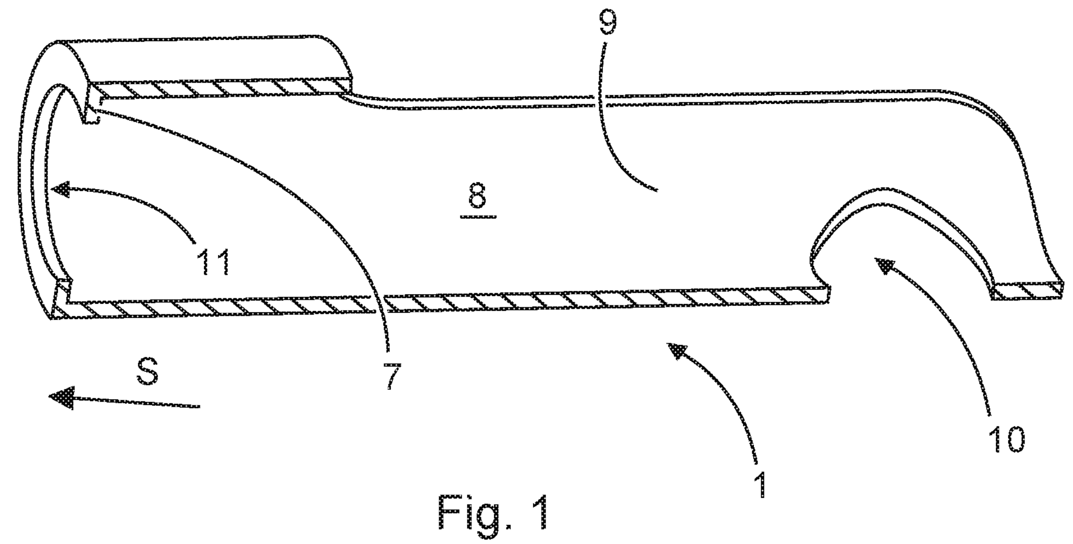
FIG. 1 shows a perspective illustration of a longitudinal section of an unlocking aid.

FIG. 1 shows an unlocking aid 1 according to the invention. The unlocking aid 1 is formed here for a connector 2 embodied as a circular connector. The unlocking aid 1 is substantially of a bushing-like design and is shown in longitudinal section. The bushing-like unlocking aid 1 is thus embodied with a hollow-cylindrical form, which can be slid over a connector. The unlocking aid 1 has a fastening device 7, in this case embodied as an inner ring. A connecting element 8 connects the fastening device 7 of the unlocking aid 1 to a gripping region 9. The embodiment of the unlocking aid 1 shown is tubular with a fastening device 7 integrally formed as a ring and with a connecting element 8 in shell form, which transitions into the gripping region 9. The gripping region 9 is embodied with a generally round through-opening, which serves as a gripping aid 10, for easy handling. The fastening device 7 is embodied as a lid on the unlocking aid 1, wherein the lid is provided with a through-opening 11.

Figure 2:
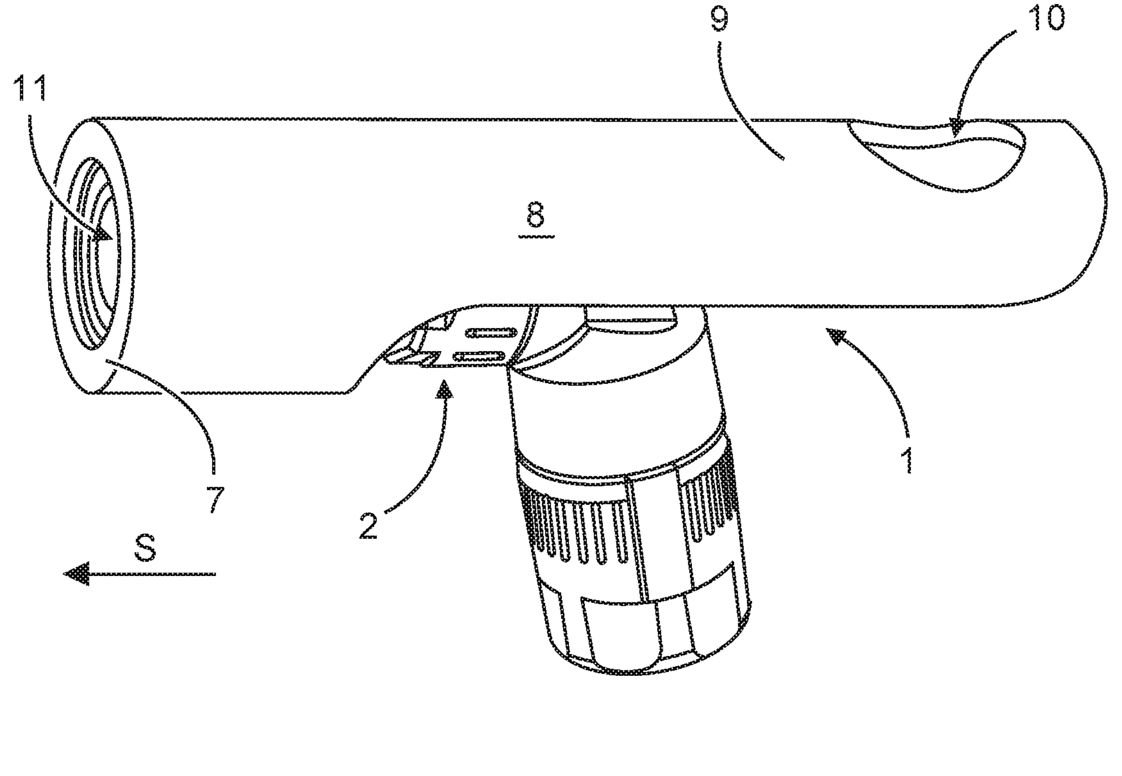
FIG. 2 shows a perspective illustration of an unlocking aid over a circular connector with angled cable outlet.

FIG. 2 shows a possible use of the unlocking aid 1 on a connector 1 with angled cable connection 5. Due to the embodiment of the unlocking aid 1 as a socket, the unlocking aid 1 can be guided directly over the locking mechanism 3 of the connector 2. The fastening device 7 of the unlocking aid 1 allows the locking mechanism 3 of the connector 2 to be unlocked by applying a pulling force against the plug-in direction S. Since the connecting element 8 is formed substantially as a half-tube, the unlocking aid 1 can also be applied in a simple manner to connectors 2 with angled cable connection 5.

Figure 3:
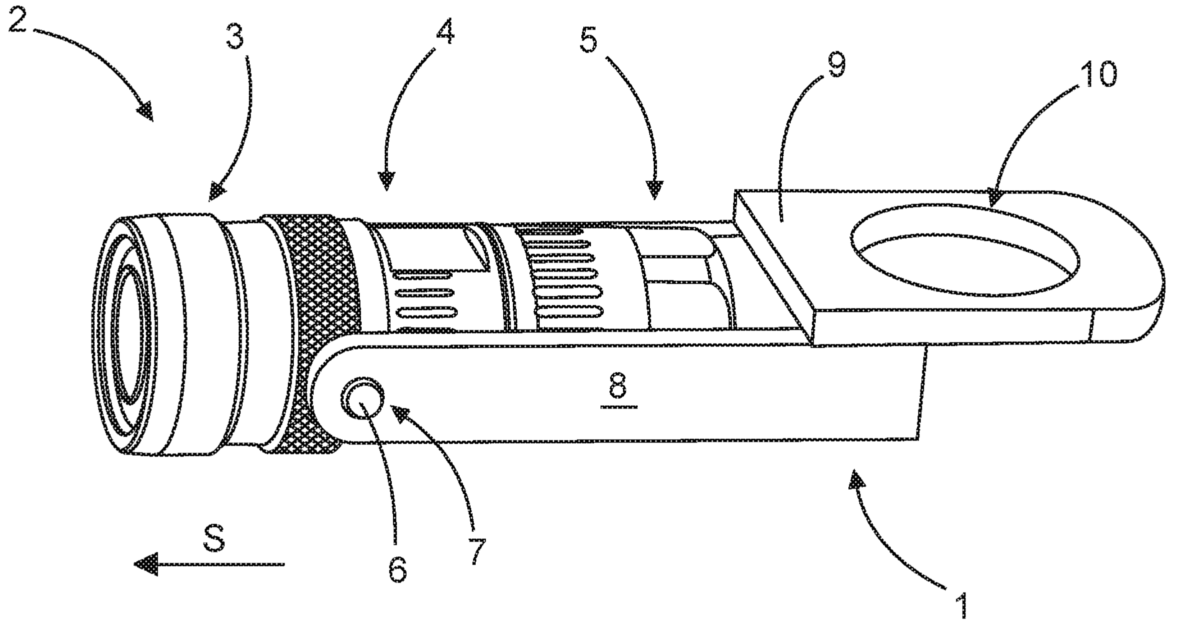
FIG. 3 shows a perspective illustration of a circular connector with an unlocking aid attached thereto.
Figure 4:
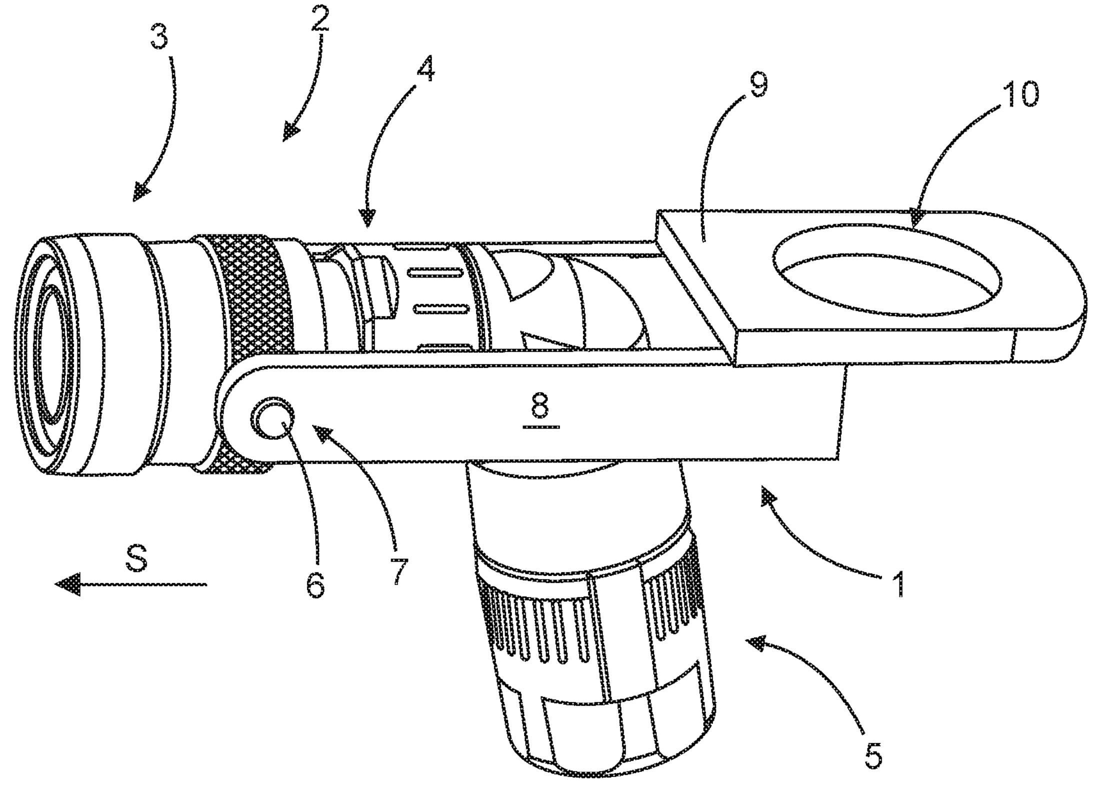
FIG. 4 shows a perspective view of a circular connector with angled cable outlet and unlocking aid.

FIG. 3 and FIG. 4 show embodiments of connectors 2 which are equipped with locking mechanisms 3 which have retaining devices 6. In FIG. 3, a connector 2 embodied as a circular connector is provided with a straight cable connection 5. In FIG. 4, a generally similarly embodied connector 2 is equipped with an angled cable connection 5. The unlocking aid 1 is attached here to the retaining devices 6 of the connector 2. Since the retaining devices 6 are embodied as pins, it makes sense to form the fastening device 7 as a blind hole or, as in the case shown, as a through-opening. The fastening devices 7 of the unlocking aid 1, which are embodied as through-openings, allow the unlocking aid 1 to be pivoted about an imaginary axis running through the connector 2. Thus, first of all, the assembly of a connector 2 is possible in a simple manner, since the unlocking aid 1 can be swung out of the assembly region without any difficulty. Furthermore, especially a connector 2 shown in FIG. 4 with an angled cable terminal 5 can be provided with an unlocking aid 1, wherein the unlocking aid 1 can be pivoted into a space-saving position in which the gripping aid 10 is located in the vicinity of the cable connection 5. The illustrated unlocking element 1 has two connecting elements 8, which are embodied as struts running parallel to one another. The connecting elements 8 are only connected in the region of the cable connection 5, or therebehind by the gripping region 9. In the embodiment shown in FIG. 3 and FIG. 4, the gripping region 9 also has a gripping aid 10 in each case, which makes it easy to apply a tensile force against the plug-in direction S.

Even though various aspects or features of the invention are each shown in combination in the figures, it is apparent to a person skilled in the art—unless otherwise indicated—that the combinations shown and discussed are not the only possible ones. In particular, corresponding units or feature complexes from different exemplary embodiments can be interchanged with each other.

The articles “a” and “an” as used in this application should generally be construed to mean “one or more” unless specified otherwise or clear from context to be directed to a singular form.

LIST OF REFERENCE SIGNS

1 unlocking aid
2 connector
3 locking mechanism
4 housing element
5 cable connection
6 retaining device
7 fastening device
8 connecting element
9 gripping region
10 gripping aid
11 through-opening
S plug-in direction

The invention claimed is:

1. An unlocking aid, comprising:
a hollow-cylindrical front portion configured to receive a circular connector therein;
an inner ring extending radially inwardly at a front end of the hollow-cylindrical front portion;
a plug through-opening formed in the inner ring, the plug through-opening being configured such that the circular connector can be brought into engagement with a mating connector therethrough;
a semi-cylindrical shell extending rearwardly from the hollow-cylindrical front portion, the semi-cylindrical shell being configured such that the circular connector can be placed therein and slid forward into the hollow-cylindrical front portion; and
a round grip through-opening extending through the semi-cylindrical shell at a rear end thereof and forming a gripping region by which the unlocking aid can be pulled rearwardly.

2. The unlocking aid as claimed in claim 1,
wherein the hollow-cylindrical front portion is configured to receive an M12 or M8 circular connector therein.

3. The unlocking aid as claimed in claim 1,
wherein the inner ring is configured to engage a locking mechanism of the circular connector, and
wherein the locking mechanism can be unlocked by pulling the unlocking aid rearwardly against a plug-in direction.

4. The unlocking aid as claimed in claim 3,
wherein the locking mechanism is a push-pull mechanism.

* * * * *